United States Patent [19]
Miyasaka

[11] Patent Number: 5,899,320
[45] Date of Patent: May 4, 1999

[54] CONVEYOR

[75] Inventor: Tetsuo Miyasaka, Nagano-ken, Japan

[73] Assignee: Maruyasu Kikai Co. Ltd., Tokyo, Japan

[21] Appl. No.: 08/459,816

[22] Filed: Jun. 2, 1995

Related U.S. Application Data

[63] Continuation of application No. 08/341,389, Nov. 17, 1994, abandoned.

[30] Foreign Application Priority Data

Nov. 19, 1993 [JP] Japan ................. P5-290512

[51] Int. Cl.[6] ........................................ B65G 13/06
[52] U.S. Cl. ............................... 198/789; 198/805
[58] Field of Search ....................... 198/619, 780, 198/789, 805

[56] References Cited

U.S. PATENT DOCUMENTS

| | | | |
|---|---|---|---|
| 3,610,402 | 10/1971 | Dubois et al. | 198/789 X |
| 4,555,105 | 11/1985 | Wyatt | 118/789 X |
| 4,781,286 | 11/1988 | Weaver | 198/789 |
| 5,377,816 | 1/1995 | Deliji et al. | 198/619 |

FOREIGN PATENT DOCUMENTS

| | | |
|---|---|---|
| 0 199 045 | 10/1986 | European Pat. Off. . |
| 62-116006 | 7/1987 | Japan . |
| 3155408 | 7/1991 | Japan ................. 198/789 |
| 6-33820 | 5/1994 | Japan . |
| 0842014 | 6/1981 | Russian Federation ......... 198/805 |
| 2 052 173 | 1/1981 | United Kingdom . |
| 2 229 691 | 10/1990 | United Kingdom . |
| WO 94/17583 | 8/1994 | WIPO . |

*Primary Examiner*—James R. Bidwell
*Attorney, Agent, or Firm*—Klauber & Jackson

[57] ABSTRACT

The present invention relates to a conveyor adapted to operate by utilization of magnetic wheels and more particularly to a conveyor wherein the power from a drive source in transmitted to a large number of rollers through magnetic wheels capable of affecting the power transfer in a non-contact manner under the action of magnetic force, whereby the rollers constituting a conveyance surface are driven to perform a simultaneous multi-shaft rotation. According to this construction, the generation of noise is suppressed and mechanical wear, rising of dust and damage are prevented. Further, it is possible to prevent the interference of magnetic forces induced inevitably between adjacent magnetic wheels and hence possible to avoid malfunction of the magnetic wheels.

18 Claims, 12 Drawing Sheets

CONVEYOR

This Application is a Continuation of application Ser. No. 08/341,389 filed Nov. 17, 1994, abandoned.

BACKGROUND OF THE INVENTION

1. Field of the Invention

The present invention relates to a conveyor and more particularly to a conveyor wherein a large number of rollers are arranged on a conveyance path and the driving force from a drive motor is transmitted to each roller by means of a drive mechanism to cause a simultaneous multi-shaft rotation of the rotors, thereby conveying articles carried on the conveyance path. Such a type of conveyors are disclosed, for example, in Japanese Utility Model Laid-Open NOS. 116006/87 and 33820/94.

2. Description of the Prior Art

Heretofore, in such a conveyor as a roller conveyor or the like wherein a large number of rollers are arranged side by side along the upper surface of a conveyance path, a belt mechanism using a round belt or a V belt has been used widely as drive means for rotating the rollers. In this type of a conveyor, an endless belt is stretched between a driving shaft supported along the lower portion of the conveyor and the rollers arranged on the conveyance surface, thereby causing the rollers to rotate simultaneously with rotation of the driving shaft.

In the conveyor wherein the rollers are driven by the use of such belt mechanism as mentioned above, the rotative driving force is transmitted to the rollers by contact of the belt with pulleys of the rollers and driving shaft so that there occur problems such as wear of the belt, rising of dust and generation of contact noise; in addition, frictional resistance is inevitably induced by such contact of the belt with the pulleys.

Further, In the case where a lot of rollers are rotated at a time as mentioned above, some troubled rollers on one shaft may affect the rotation of the other rollers, and sometimes there occurs such an inconvenience as cutting of the belt and stranding.

BRIEF DESCRIPTION OF THE DRAWINGS

FIG. 11(*a*) is a front view of a driven magnetic wheel formed in the shape of a regular hexagonal pyramid and FIG. 11(*b*) is a side view thereof;

FIG. 12(*a*) is a front view of a driven magnetic wheel formed in a conical shape and FIG. 12(*b*) is a side view thereof;

FIG. 18(*a*) is a front view of a driven magnetic wheel formed in the shape of a regular hexagon plate and FIG. 18(*b*) is a side view thereof;

FIG. 19(*a*) is a front view of a driven magnetic wheel formed in the shape of a disk and FIG. 19(*b*) is a side view thereof;

SUMMARY OF THE INVENTION

It is an object of the present invention to provide a conveyor which is provided with a simultaneous multi-shaft rotation means capable of eliminating the foregoing problem encountered in the conventional conveyor belt drive mechanism and which thereby can reduce wear, rising of dust and generation of contact noise, with no likelihood of some troubled rollers affecting the rotation of the other rollers.

It is another object of the present invention to rationally prevent the interference of a magnetic force which is created inevitably between adjacent magnetic wheels in the case of using magnetic wheels as the rotation means for achieving the above-mentioned object.

DESCRIPTION OF THE PREFERRED EMBODIMENTS

Figure 1:
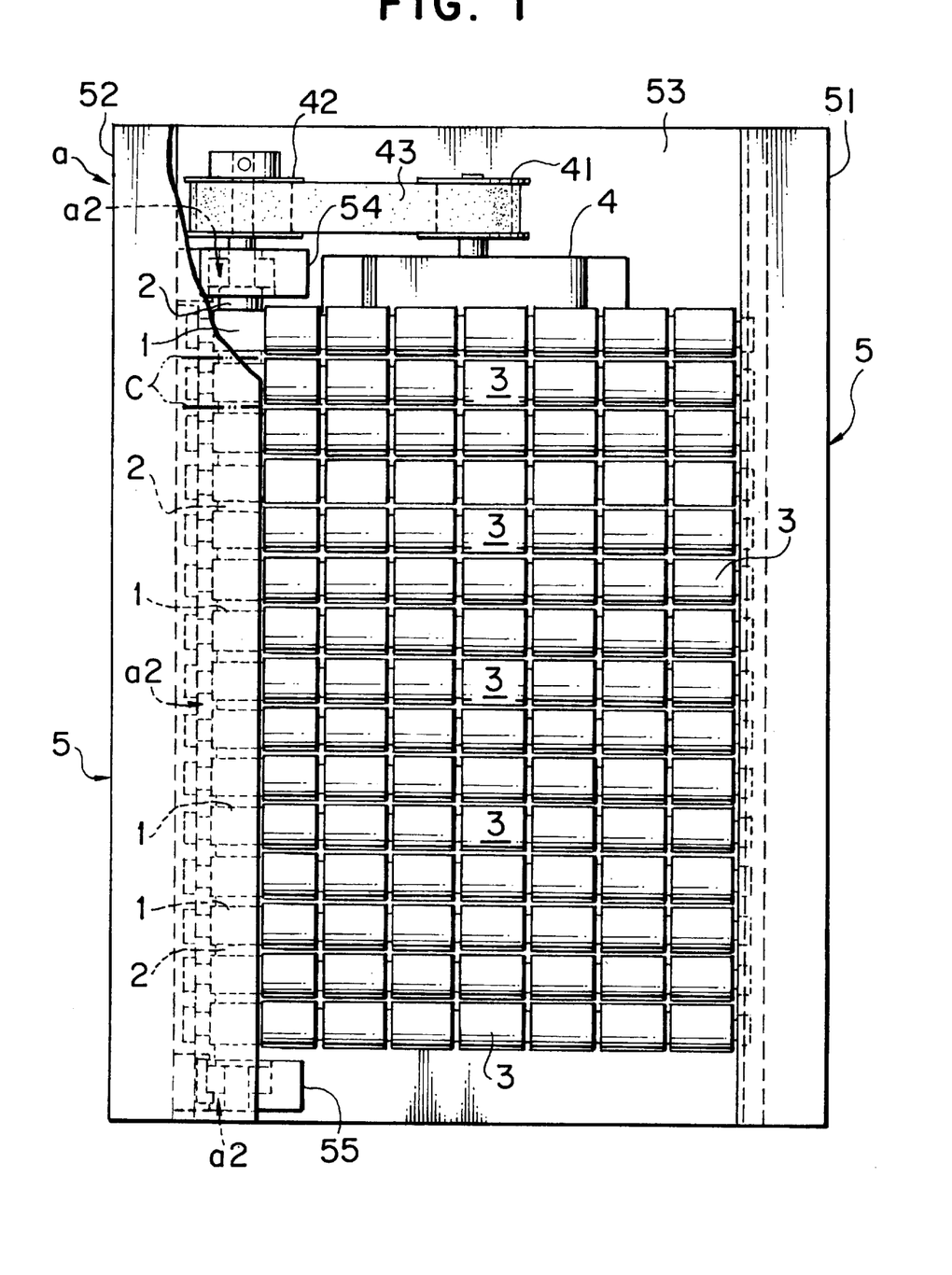
FIG. 1 is a partially cut-away plan view of a roller conveyor embodying the present invention.
Figure 2:
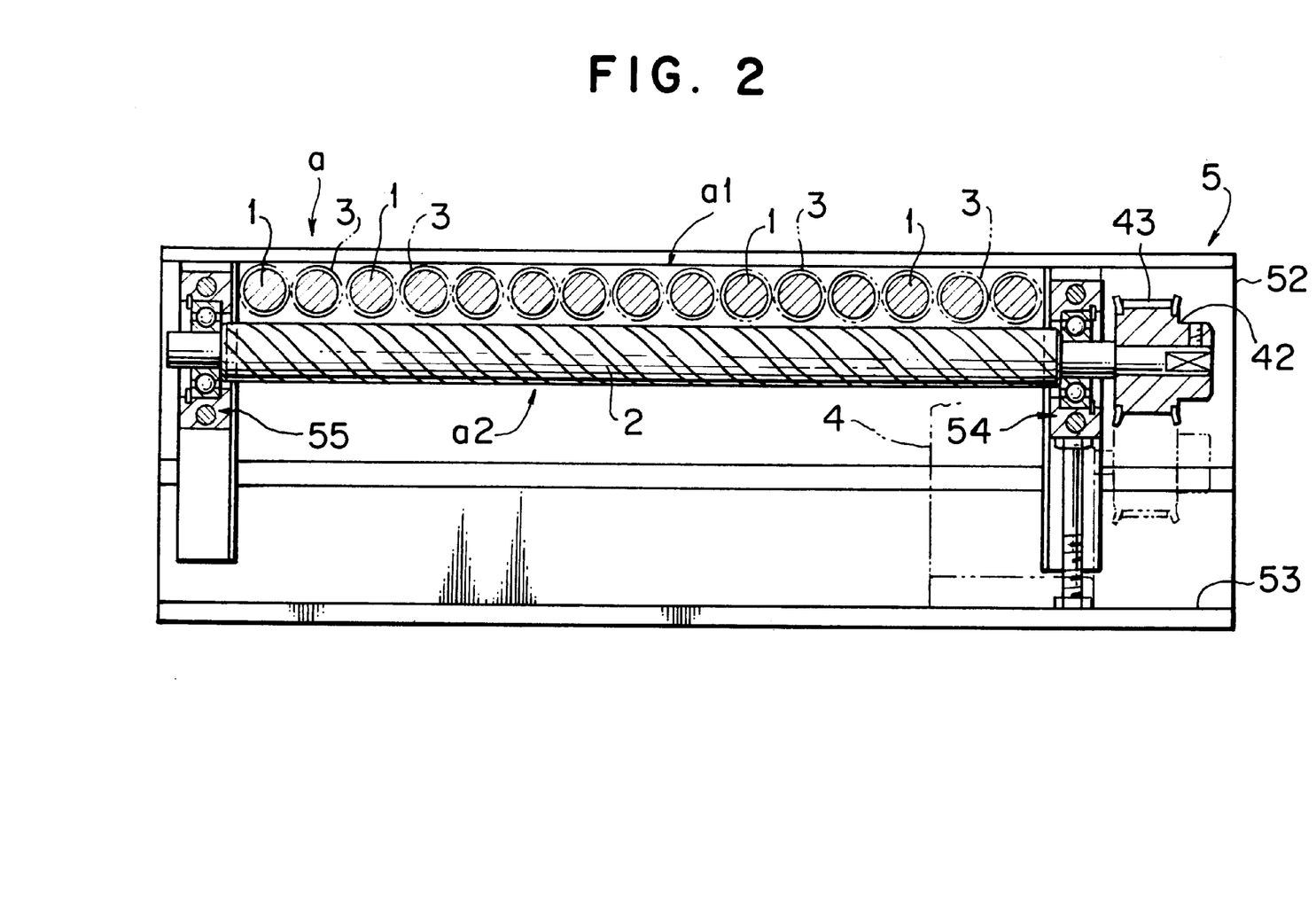
FIG. 2 is a front view in longitudinal section of the roller conveyor.
Figure 3:
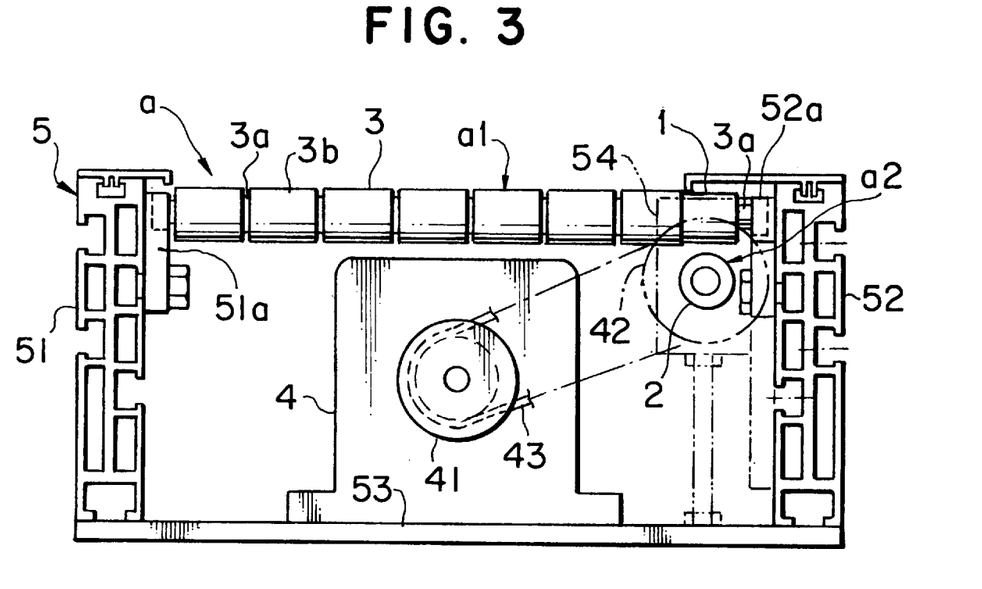
FIG. 3 is a side view of the roller conveyor.

According to the construction of a roller conveyor a illustrated in FIGS. 1 to 3, a large number of rollers 3 are arranged side by side along the upper surface of a conveyor body 5 to constitute a conveyance surface, and the rollers 3 are rotated simultaneously through a multitude of shafts by means of a drive mechanism a2 which is provided along one side within the conveyor body 5, to thereby convey articles put on the conveyance surface a1.

The conveyor body 5 comprises a bottom plate 53 and side plates 51 and 52 which are erected on both left and right sides of the bottom plate. A large number of rollers 3 are horizontally mounted bridgewise between the upper sides of the left and right side plates 51, 52, and both end portions of each row of rollers 3 are supported by bearings 51*a* and 52*a* attached to the side plates 51, 52, respectively, whereby the rollers are supported rotatably. The rollers 3 supported in this manner are arranged through slight gaps on the same plane to constitute the conveyance surface 1a.

As shown in FIG. 3, each roller 3 is constituted by fitting a short cylinder-like unit roller 3b on the outer periphery of a rotatable shaft 3a, and a driven magnetic wheel 1 of the drive mechanism a2 is fixed onto one end of the rotatable shaft 3a.

The drive mechanism a2 is for transmitting the driving force from a drive motor 4 mounted at a start-end portion within the conveyor body 5 to the rollers 3 to rotate the rollers simultaneously through a multitude of shafts. It comprises a driving magnetic wheel 2 supported along one side of the conveyor body 5 and a large number of driven magnetic wheels 1 attached to one roller ends and arranged along and just above the driving magnetic wheel 2.

The driving magnetic wheel 2, which is formed in the shape of a long shaft, is horizontally disposed substantially, along the overall length of the side plate 52 and both end portions thereof are rotatably supported by bearings 54 and 55 which are mounted vertically movably with respect to the side plate 52, as shown in FIG. 2.

To one end of the driving magnetic wheel 2 is mounted a pulley 42, and a driving belt 43 is stretched between the pulley 42 and a pulley 41 mounted to the motor 4 so that the driving magnetic wheel 2 is rotated upon operation of the drive motor 4.

Figure 4:
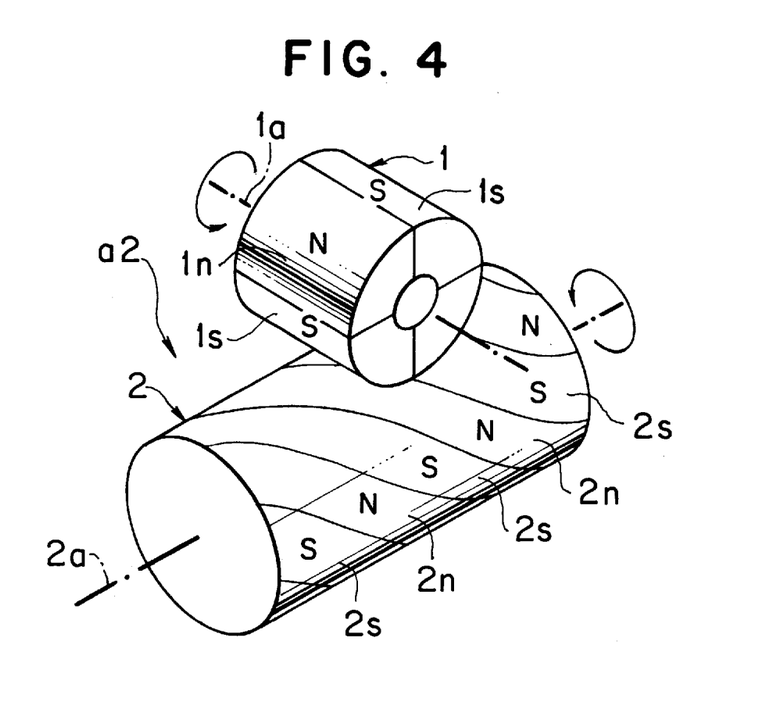
FIG. 4 is a perspective view showing a positional relation between a driving magnetic wheel and a driven magnetic wheel.
Figure 5:
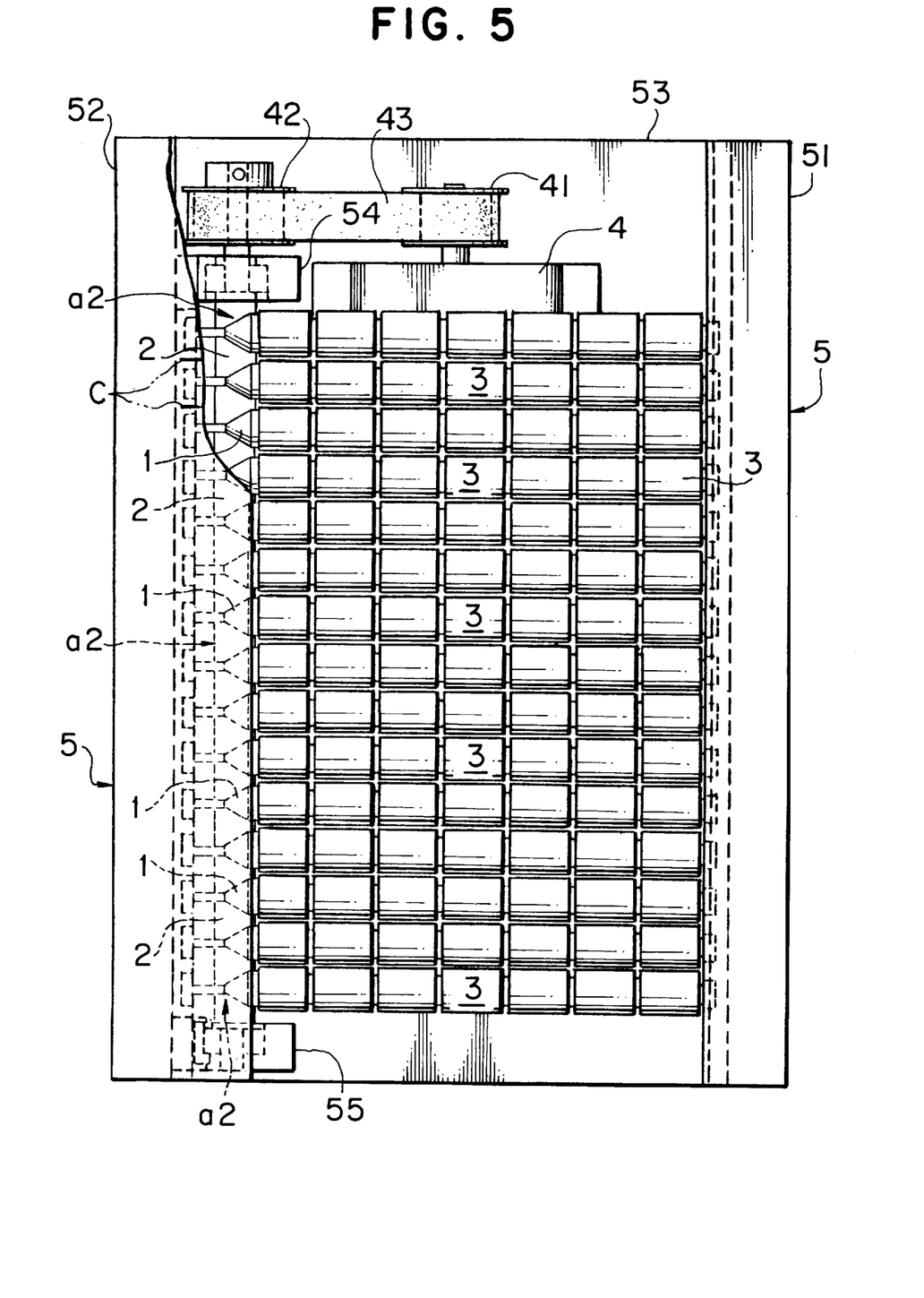
FIG. 5 is a partially cut-away plan view of a roller conveyor having driven magnetic wheels each formed in a conical shape.

As shown in FIG. 4, the driving magnetic wheel 2 and each driven magnetic wheel 1 are journalled in such a manner that the respective axes 2a and 1a intersect each other perpendicularly and that the respective peripheral surfaces are close to each other, but not in contact with each other, through a relatively small gap.

The driving magnetic wheel 2 is constituted by magnetizing N-pole to zone 2n and S-pole zone 2s to the peripheral surface of a cylindrical body which is formed in the shape of a long shaft using a permanent magnet, e.g. Mn—Al magnet, spirally throughout the overall length of the cylindrical body.

On the other hand, each driven magnetic wheel fixed to one roller end is constituted by the same permanent magnet as that of the driving magnetic wheel 2. The peripheral surface of a cylindrical body formed in the shape of a short shaft is divided at equal intervals in the circumferential direction, and N-pole zone 1n and S-pole zone 1s of the permanent magnet are magnetized in an alternate manner to the divided band-like sections. The axial pitch of both NS zones 2n and 2s, namely, the spiral pitch, is made coincident with the circumferential pitch of both NS zones 1n and 1s of the driven magnetic wheel 1.

Although in the above embodiment the peripheral surface of the cylindrical body is divided into four, the number of division is not limited to four if only the NS zones 1n and 1s can be magnetized in an alternate manner.

Although in the above embodiment both magnetic wheels 2 and 1 are constituted by magnetizing the pole zones 2n, 2s, 1n and 1s to the peripheral surfaces of cylindrical bodies, both magnetic wheels may be constituted by fixing individual permanent magnets to the peripheral surfaces of cylindrical bodies to form pole zones 2n, 2s, 1n and 1s, or may be constituted by winding rubber or plastic magnets to the surfaces of cylindrical bodies to form pole zones 2n, 2s, 1n and 1s (not shown).

In the drive mechanisms a2, as mentioned above, both NS pole zones 2n and 2s of the driving magnetic wheel 2 are magnetized spirally along the peripheral surface of the magnetic wheel. Since the spiral pitch of both pole zones 2n and 2s is made coincident with that of both NS pole zones 1n and 1s of each driven magnetic wheel, N and S pole zones 2n, 1s/2s, 1n between both magnetic wheels 2 and 1 try to keep closest to each other at all times under the action of an attractive force induced by a magnetic field (FIG. 4).

In the above construction, as the driving magnetic wheel 2 is rotated from the above state, both pole zones 2n and 2s shift continuously in the axial direction of the driving magnetic wheel.

On the other hand, since each driven magnetic wheel 1 intersects the driving magnetic wheel 2 perpendicularly at its axis 1a and NS pole zones 1n, 1s are arranged alternately on the peripheral surface of the driven magnetic wheel, the NS zones 1n and 1s move successively with the movement of the NS zones 2n and 2s of the driving magnetic wheel 2, resulting in that the driven magnetic wheel comes to rotate.

In such a manner the rotation of the driving magnetic wheel 2 is transmitted to each driven magnetic wheel 1, which in turn rotates in a synchronized state with the rotation of the driving magnetic wheel, so that the rollers 3 on the conveyance surface a1 rotate in the same direction. When the driving magnetic wheel 2 is rotated in the reverse direction, the driven magnetic wheels 1 also rotate in the reverse direction. Since the roller conveyor a constructed as above is provided with the drive mechanism a2 which performs the transfer of driving force while maintaining the state of non-contact between the driving and driven magnetic wheels by utilizing the magnetic force of permanent magnets, there arise no such problems as in the use of the conventional conveyor using belt for rotation, like wear of the belt, rising of dust, generation of contact noise and that of contact resistance, and it is possible to effect in an extremely smooth manner the transfer of driving force in the simultaneous multi-shaft rotation of the rollers 3.

In the event a load or impact force exceeding a predetermined certain level is applied to some rollers 3 during operation of the roller conveyor a, the driving magnetic wheel 2 exhibits an idling function, or a so-called torque-free function, due to deformation of the magnetic field between the driving and driven magnetic wheels 2, 1. Thus, even when some rollers 3 undergo an excessive load and come to there will not arise any such problem as in the conventional belt-driven conveyor like belt cutting, stranding and disengagement.

In the conventional belt-driven type conveyor, when the operation is resumed after standing a long period of time, the conveyor is sometimes inoperative due to sticking of the belt for example. On the other hand, according to the roller conveyor a described above, it is not necessary to be anxious about sticking of the belt, and even after standing over a long period of time, it is possible to resume operation without any trouble.

In the roller conveyor a of the present invention, moreover, since it is not necessary to ensure the mounting space for a belt, it is possible to attain space-saving and suppress the height of the entire machine. At the same time, since the belt passing operation for each roller 3 at the time of assembly is no longer required, it is possible to greatly shorten the time required for the assembling work.

If the spacing between adjacent driven magnetic wheels 1 arranged side by side is too small there will occur interference of magnetic field between both driven magnetic wheels, which may result in each driven magnetic wheel failing to turn normally. In the case where the spacing between adjacent driven magnetic wheels 1 is compelled to set small, then as shown in FIG. 1, by interposing a magnetic plate c between adjacent driven magnetic wheels 1, it is made possible to prevent the interference of the magnetic fields therebetween and effect the simultaneous multi-shaft rotation without any trouble.

In the drive mechanism a2 constructed as above, if the driven magnetic wheels 1 arranged a large number in parallel are caused to rotate at a time, the magnetic lines of force of adjacent magnetic wheels 1 will interfere with each other, with the result that the simultaneous multi-shaft rotation can no longer be performed normally.

In the conveyor described above, in view of the point just mentioned, the magnetic plate c is interposed between adjacent driven magnetic wheels 1 to prevent the interference of magnetic fields therebetween. However, since this countermeasure requires the additional provision of the magnetic plates c, an increase of cost results. Besides, the interference between adjacent driven magnetic wheels 1 is not prevented to a perfect extent. Therefore, it is desired to use mans capable of completely preventing the interference between adjacent driven magnetic wheels 1 without causing any increase of cost.

The following description is now provided about an embodiment of a conveyor provided with a drive mechanism which prevents the interference of magnetic lines of force between adjacent driven magnetic wheels 1 without using the magnetic plate c referred to above. According to the construction of a drive mechanism a2-1 illustrated in FIGS. 6 to 8, a large number of driven magnetic wheels 1 and a driving magnetic wheel 2 which is generally in the shape of a shaft are supported rotatably in a perpendicularly crossed state.

Figure 6:
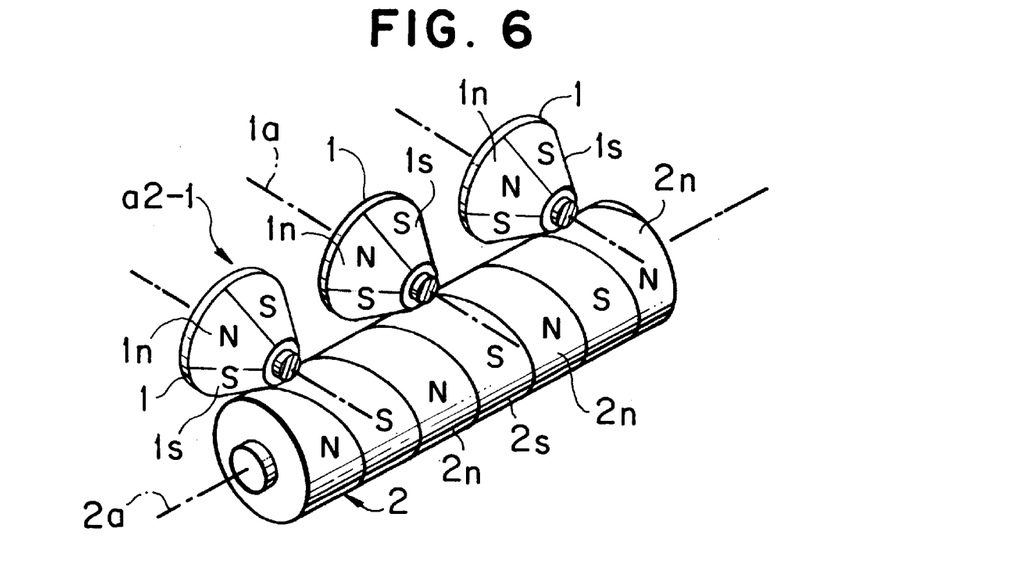
FIG. 6 is a perspective view showing a drive mechanism according to the present invention.
Figure 7:
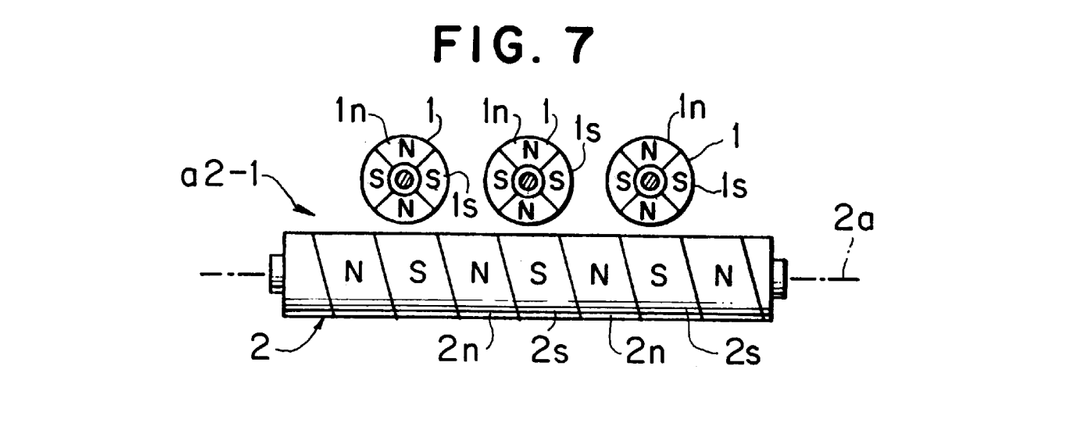
FIG. 7 is a front view of the drive mechanism.
Figure 8:
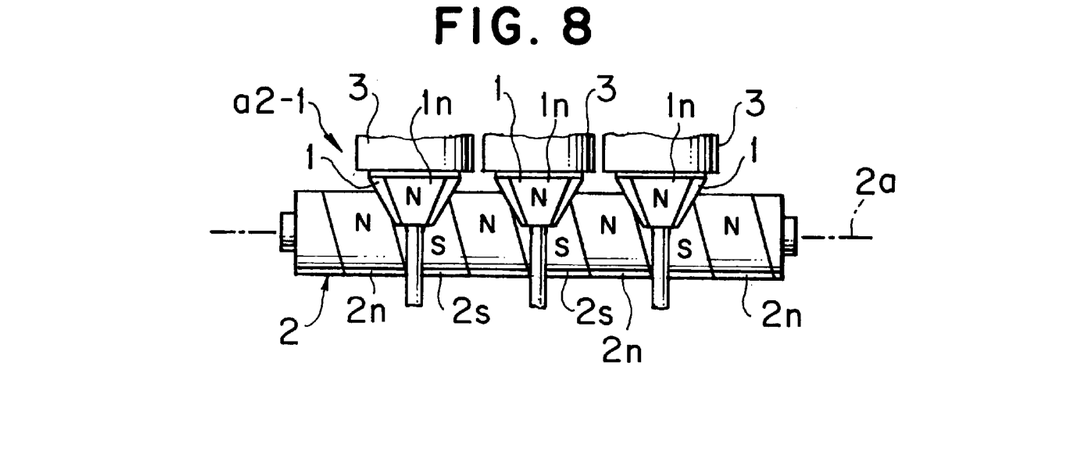
FIG. 8 is a partial plan view of the drive mechanisms.

Each driven magnetic wheel 1 is constituted by a permanent magnet, e.g. Mn—Al magnet, and is formed generally in a conical shape. The conical surface of the magnetic wheel is divided in four at equal intervals in the circumferential direction, and in the thus-divided sections, which are generally sectorial, are magnetized N- and S-pole zones 1n, 1s each composed of the permanent magnet in an alternate manner. The driven magnetic wheels 1 thus constructed are connected each individually to end portions of rollers 3 so as to rotate integrally with the rollers.

On the other hand, the driving magnetic wheel 2 is constituted by the same permanent magnet as that of the driven magnetic wheels 1, and N- and S-pole zones 2n, 2s are magnetized spirally to the peripheral surface of a cylindrical body formed in the shape of a long shaft. The axial pitch of the N- and S-pole zones 2n 2s, namely the spiral pitch, is made coincident with the circumferential pitch of the N- and S-pole zones 1n, 1s of each driven magnetic wheel 1.

The driven and driving magnetic wheels 1, 2 are journalled rotatably in such a manner that the respective axes 1a and 2a intersect each other perpendicularly. In this case, the driven magnetic wheels 1 are supported in a somewhat shifted state to one side of the axis 2a of the driving magnetic wheel 2, as shown in FIG. 6, and both wheels 1 and 2 are positioned close to each other, but not in contact with each other, through a relatively small gap between the conical surface of each driven magnetic wheel 1 and the peripheral surface of the driving magnetic wheel 2.

In the drive mechanism a2-1, as mentioned above, the NS zones 2n, 2s of the driving magnetic wheel 2 are formed spirally along the peripheral surface of the magnetic wheel. Further, the spiral pitch of 2n, 2s is made coincident with the pitch of NS zones 1n, 1s of each driven magnetic wheel 1. Consequently, the N- and S-pole zones 1n, 2s /1s, 2n between the driven and driving magnetic wheels 1, 2 try to be closest to each other at all times under the action of an attractive force based on magnetic field (FIG. 6).

For example, when the driving magnetic wheel 2 is rotated from the above state, its NS zones 2n, 2s shift axially with the rotation. On the other hand, since the axis 1a of each driven magnetic wheel 1 intersects the axis 2a of the driving magnetic wheel 2 perpendicularly and NS zones 1n, 1s are formed alternately along the circumference of the conical surface, the NS zones 1n, 1s also move successively with the movement of the NS zones 2n, 2s of the driving magnetic wheel 2, thus causing rotation of the driven magnetic wheel. In this way the rotation of the driving magnetic wheel 2 is transferred to the driven magnetic wheels 1, so that the driven magnetic wheels rotate continuously with the rotation of the driving magnetic wheel. This operation per se is just the same as the operation of the drive mechanism a2 described previously although the shape of each driven magnetic wheel 1 used in this embodiment is different from the previous one.

The driven magnetic wheels 1 in the drive mechanism a2-1 described above are each formed generally in a conical shape, so when this shape is compared with the cylindrical shape of each driven magnetic wheel 1 in the previous drive mechanism a2, it is seen that the spacing between the magnetic surfaces of adjacent driven magnetic wheels 1 substantially becomes wider, thus making it possible to diminish the interference of magnetic forces between adjacent driven magnetic wheels.

The driven magnetic wheels 1 may each be generally conical or generally in a regular polygonal cone. For example, a truncated cone shape or a regular polygonal truncated cone shape may also be adopted in addition of a complete conical shape.

Although in the above embodiment the conical surface of each driven magnetic wheel 1 is divided in four and NS zones 1n, 1s are formed in the divided four sections in an alternate manner, the number of divided section is not limited to four. Even a larger or smaller number than four may be adopted if only NS zones can be formed in an alternate way. In the case where the number of NS zones 1n, 1s is increased or decreased, it is necessary that the spiral pitch of NS zones 2n, 2s of the driving magnetic wheel 2 be made coincident with the resulting pitch of 1n, 1s.

Figure 9:
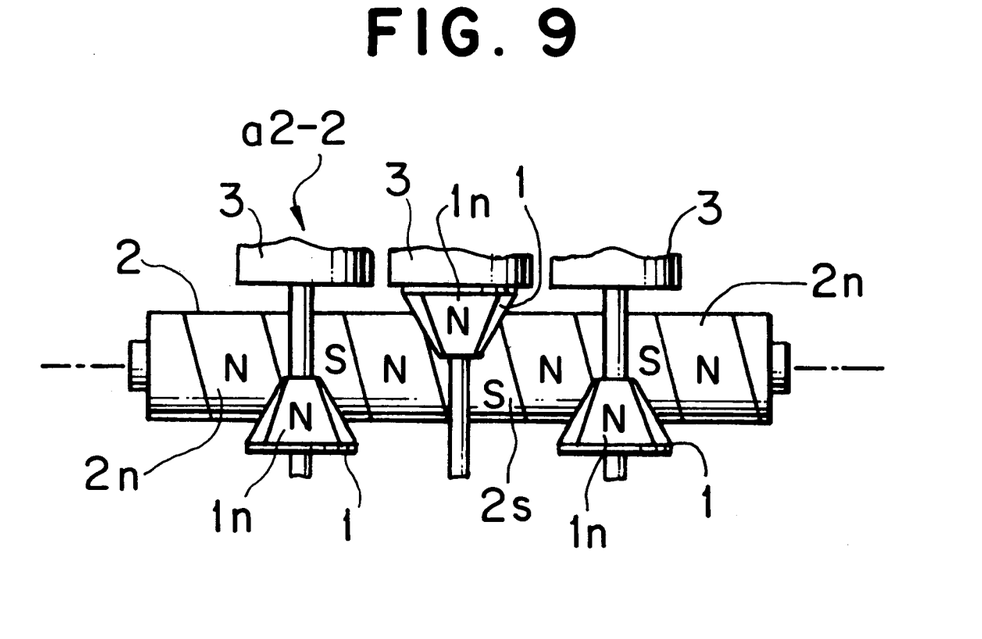
FIG. 9 is a partial plan view of a drive mechanism wherein a plurality of driven magnetic wheels are arranged in an alternate manner relative to a driving magnetic wheel.
Figure 10:
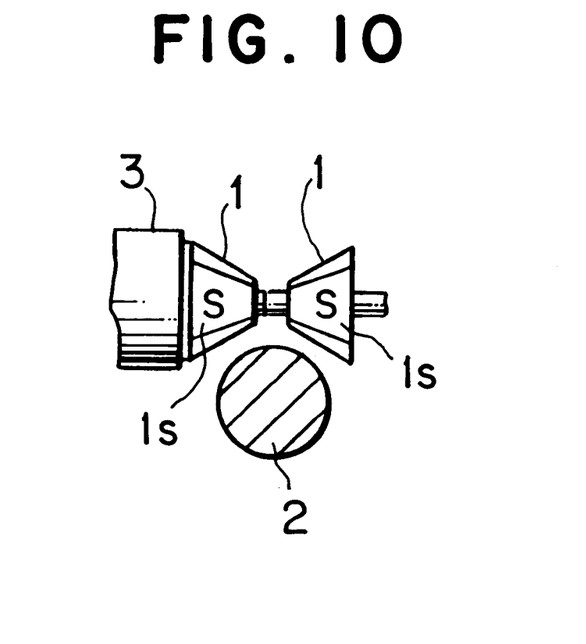
FIG. 10 is a vertical sectional view of the drive mechanism shown in FIG. 9.

A drive mechanism a2-2 shown in FIGS. 9 and 10 comprises a driving magnetic wheel 2 and a large number of driven magnetic wheels 1 like the drive mechanism a2 described previously. In the drive mechanism a2-2, however, the driven magnetic wheels 1 are arranged along the axis 2a of the driving magnetic wheel 2 and at predetermined intervals corresponding to the intervals of rollers 3 so as to be positioned alternately on one side of the axis 2a of the driving magnetic wheel and on the other side thereof in such a manner that their conical surfaces are opposed to each other toward the axis 2a. That is, adjacent driven magnetic wheels 1 arranged along the axis 2a of the driving magnetic wheel 2 are positioned in a sandwiching relation to the axis 2a, one being on one side of the axis 2a and the other being on the opposite side. In this state, the conical surfaces of the adjacent driven magnetic wheels are opposed to each other with the driving magnetic wheel 2 therebetween.

According to the above arrangement of the driven magnetic wheels 1, the distance between the peripheral surface of the driving magnetic wheel 2 and the conical surfaces of the driven magnetic wheels 1 becomes shorter, while the distance between the conical surfaces of adjacent driven magnetic wheels 1 becomes longer, so that it is possible to effectively diminish the interference of magnetic forces between adjacent driven magnetic wheels, whereby it is made possible to fundamentally remedy the malfunction of the driven magnetic wheels caused by such interference.

Figure 11A:
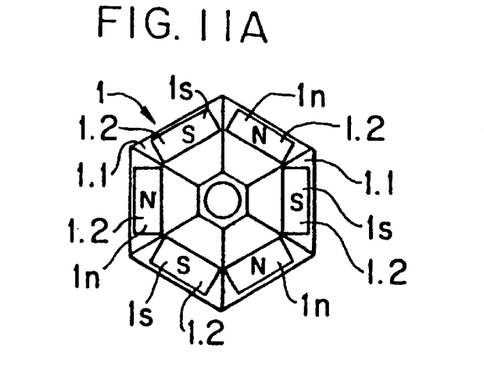
Figure 11B:
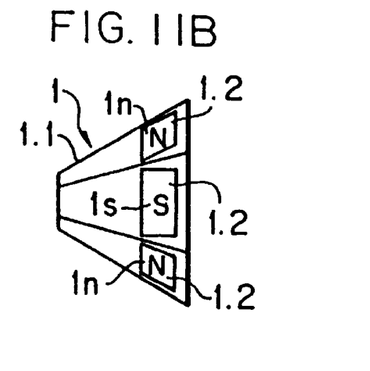

Although in each of the driven magnetic wheels 1 used in the drive mechanisms a2-1 and a2-2 described above the N- and S-pole zones 1n, 1s are formed by magnetization on the conical surface of the magnetic wheel body which is generally conical, the driven magnetic wheel may be constituted like those shown in FIGS. 11 and 12.

Figure 12A:
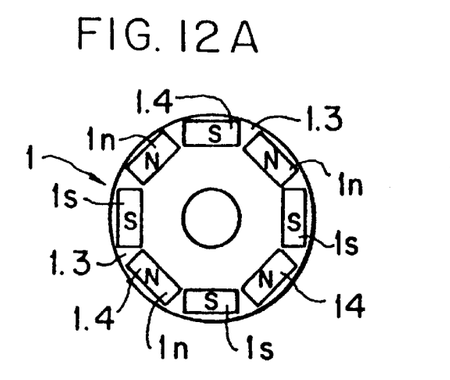
Figure 12B:
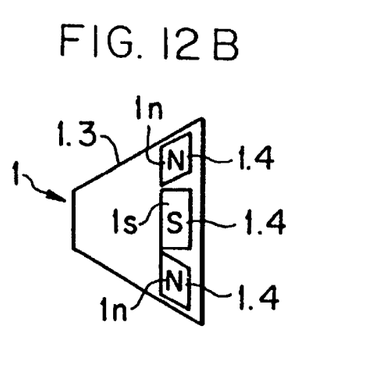

In the driven magnetic wheel 1 shown in FIGS. 12(a) and 12(b), permanent magnets 1.4, e.g. ferrite or rare earth metal magnets, are fixed to the conical surface of a conical magnetic wheel body 1.3 in such a manner that N and S poles appear alternately on the outer surface, to thereby form N-pole zones 1n and S-pole zones 1s. This structure is advantageous in that the NS zones 1n and 1s can be produced less expensively. In the driven magnetic wheel 1 shown in FIGS. 11(a) and 11(b), permanent magnets 1.2, e.g. ferrite or rare earth metal magnets, are fixed to the plans peripheral portions of a magnetic wheel body 1.1 formed generally in a regular hexagonal cone in such a manner that N and S poles appear alternately on the outer surface, to thereby constitute N-pole zones 1n and S-pole zones 1z. The shape of the magnetic wheel body 1.1 is not limited to the hexagonal shape. Any other polygonal shape may be adopted if only the N- and S-pole can be arranged in an alternate manner.

Figure 13:
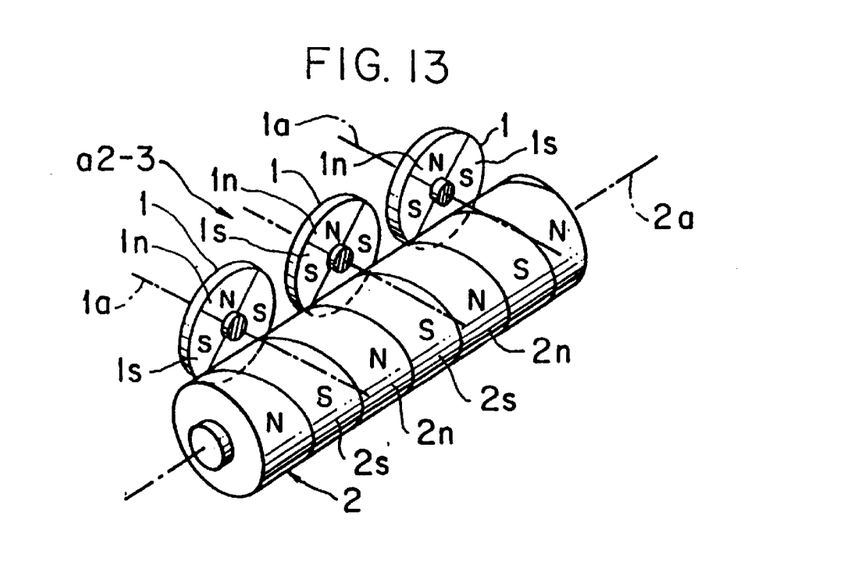
FIG. 13 is a perspective view of a drive mechanism having disk-like driven magnetic wheels.
Figure 14:
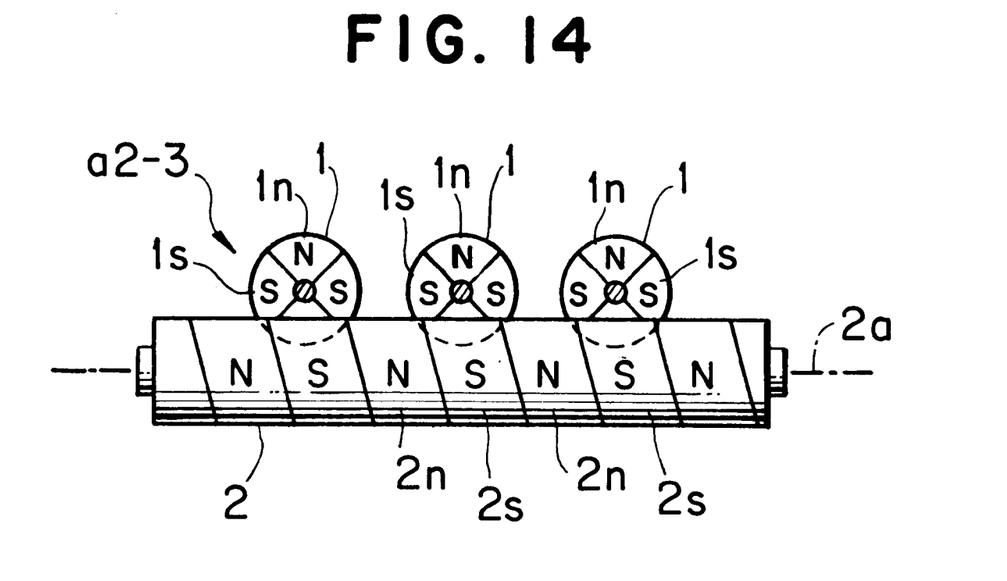
FIG. 14 is a front view thereof.
Figure 15:
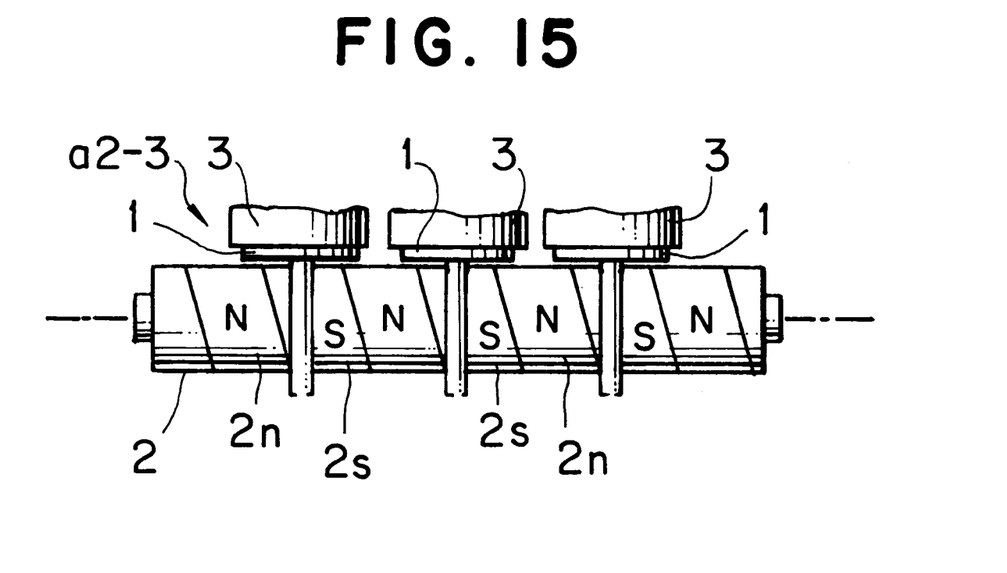
FIG. 15 is a plan view thereof.

In a drive mechanism a2-3 shown in FIGS. 13 to 15, disk-like driven magnetic wheels 1 and a driving magnetic wheel 2 are supported rotatably in a perpendicularly crossed state. Like the drive mechanism a2 described previously, each driven magnetic wheel 1 is constituted by a permanent magnet, e.g. Mn—Al magnet, and one end face of a magnetic wheel body formed in disk shape is divided in four at equal intervals in the circumferential direction, then N- and S-pole zones 1n, 1s of the permanent magnet are formed by magnetization alternately in the divided sections which are sectorial.

On the other hand, in the driving magnetic wheel 2, as in the drive mechanism a2, N- and S-pole zones 2n, 2s are spirally formed by magnetization on the peripheral surface of a cylindrical body which is in the shape of a long shaft, and the spiral pitch of the NS zones 2n, 2s is made coincident with the circumferential pitch of go zones 1n, 1s on one end face of the driven magnetic wheel 1.

The driven and driving magnetic wheels 1, 2 are journalled rotatably in a perpendicularly crossed state at the respective axes 1a and 2a so that the driven magnetic wheels 1 are deviated to one side of the axis 2a of the driving magnetic wheel 2, as shown in FIG. 13. In this state, the driven and driving magnetic wheels 1, 2 are positioned close to each other, but not in contact with each other, through a relatively small gap between the end faces of the driven magnetic wheels 1 and the peripheral surface of one side portion of the driving magnetic wheel 2 (FIG. 15).

The drive mechanism a2-3 also operates in the manner as the drive mechanism a2, a2-1 and a2-2 to effect the transfer of driving force. Therefore, explanation of its operation will be omitted here. According to the drive mechanism a2-3, since the effective area of the closely spaced portion between the peripheral surface of the driving magnetic wheel 2 and one and face of each driven magnetic wheel 1, with a magnetic force exerted thereon, can be ensured large, it becomes possible to ensure a large driving torque.

In the drive mechanism a2-3, moreover, since each driven magnetic wheel 1 is in the shape of a disk, the magnetic field created by the NS zones 1n and 1s of the driven magnetic wheel is strong in front of the pole zones 1n, 1s and weak in the outer peripheral direction, so it in possible to diminish the interference of magnetic forces between adjacent driven magnetic wheels, Further, the drive mechanism a2-3 also has a torque-free function like the drive mechanisms a2, a2-1 and a2-2 described previously.

Figure 16:
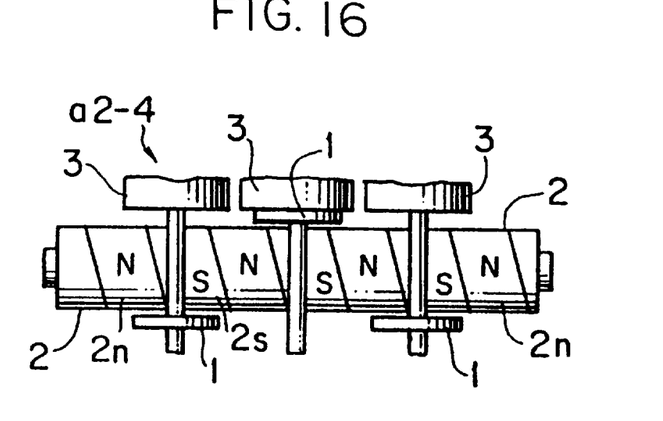
FIG. 16 is a plan view of a drive mechanism having disk-like driven magnetic wheels arranged in an alternate manner relative to a driving magnetic wheel.
Figure 17:
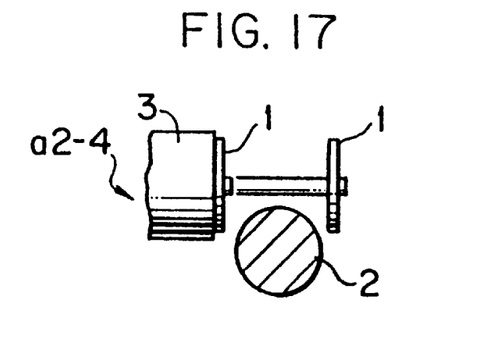
FIG. 17 is a vertical sectional view thereof.

The drive mechanism shown in FIGS. 16 and 17, indicated at a2-4, also comprises a driving magnetic wheel 2 and a large number of driven magnetic wheels 1 provided correspondingly to rollers 3, like the drive mechanism a2-3. In the drive mechanism a2-4, however, the driven magnetic wheels 1 are arranged along the axis 2a of the driving magnetic wheel 2 and at intervals corresponding to the spiral pitch of N- and S-pole zones 2n, 2s of the driving magnetic wheel 2 so as to be positioned alternately one being on one side of the axis 2a and the other being on the opposite side thereof in such a manner that their and faces on the driving magnetic wheel 2 side are opposed to each other toward axis 2a of the driving magnetic wheel.

Thus, in the drive mechanism a2-4, adjacent driven magnetic wheels 1 are alternately arranged, one being on one side of the axis 2a of the driving magnetic wheel 2 and the other being on the opposite side thereof along and in a sandwiching relation to the axis 2a. Consequently, the distance between end faces of adjacent driven magnetic wheels 1 can be made longer, and coupled with the interference preventing effect attained by the disk shape of the driven magnetic wheels 2, it is possible to prevent the interference of magnetic forces between adjacent driven magnetic wheels more effectively.

The shape of the driven magnetic wheels 1 used in the drive mechanisms a2-3 and a2-4 described above my be a regular polygonal plate shape such as hexagonal or octagonal shape in addition to a generally disk shape. Further, although in the above embodiment an end face of each driven magnetic wheel 1 is divided in four and NS sones 1n, 1s are formed in the divided sections, the number of divided sections in not limited to four. Even a larger or smaller number will do if only N- and S-pole zones can be formed alternately. It goes without saying that in the case where the number of NS zones 1n, 1s increased or decreased, it is necessary to make the spiral pitch of NS zones 2n, 2s coincident with the resulting pitch.

Although in each of the driven magnetic wheels 1 used in the drive mechanisms a2-3 and a2-4 N- and S-pole zones 1n, 1s are formed by magnetization on an end face of a generally disk-like magnetic wheel body, the driven magnetic wheel may be constituted like that illustrated in FIG. 18 or 19.

Figure 19A:
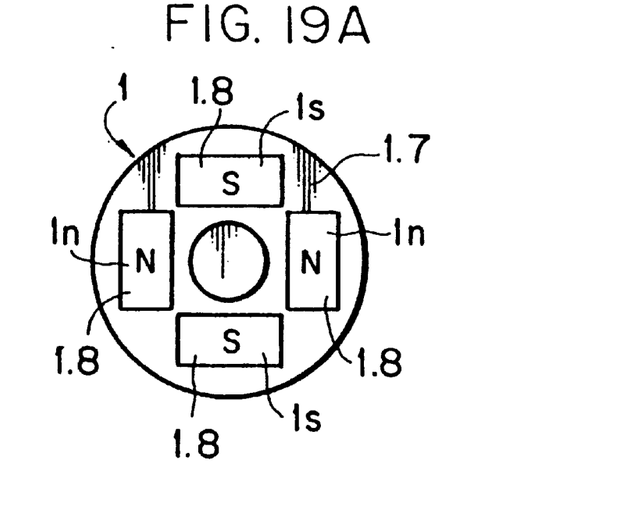
Figure 19B:
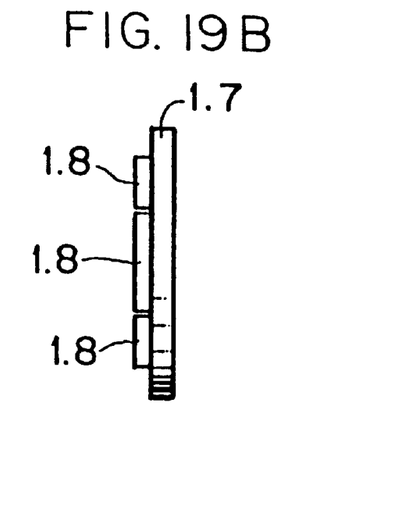

In the driven magnetic wheel 1 shown in FIGS. 19(a) and 19(b), permanent magnate 1.8, e.g. ferrite or rare earth metal magnets, are fixed to one end face of a disk-shaped magnetic wheel body 1.7 to that N and S poles appear alternately, to constitute N- and S-pole zones 1n, 1s.

Figure 18A:
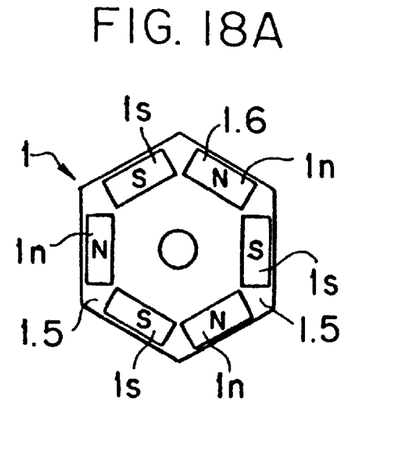
Figure 18B:
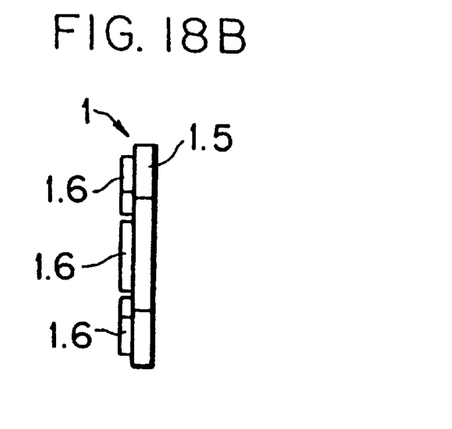

In the driven magnetic wheel 1 shown in FIGS. 18(a) and 18(b), permanent magnets 1.6, e.g. ferrite or rare earth metal magnets, are fixed to the marginal portion of an end face of a magnetic wheel body 1.5 having a generally regular hexagonal plate shape in such a manner that N and S poles appear alternately, to thereby constitute N- and S-pole zones 1n, 1s. The shape of the magnetic wheel body 1.5 is not limited to the hexagonal shape. Any other polygonal shape my be adopted if only N and S pole zones can be arranged alternately.

The above structure of the driven magnetic wheel 1 permits simple low-cost production of NS pole zones 1n, 1s.

The driving magnetic wheels used in the drive mechanisms a2 to a2-4 may be constituted as shown in FIG. 20 to 25, whereby NS pole zones 2n, 2s can be produced lose expensively in a simple manner.

Figure 20:
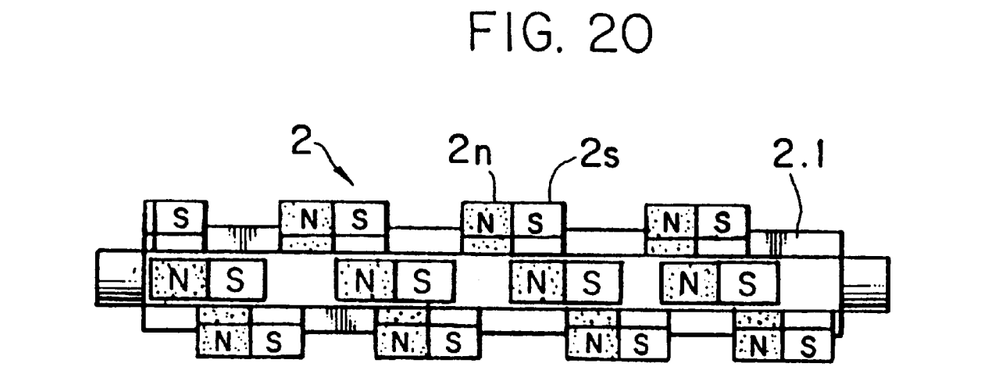
FIG. 20 is a front view of a driving magnetic wheel having permanent magnets of both N and S poles which are fixed to the peripheral surface of a cylindrical body.
Figure 21:
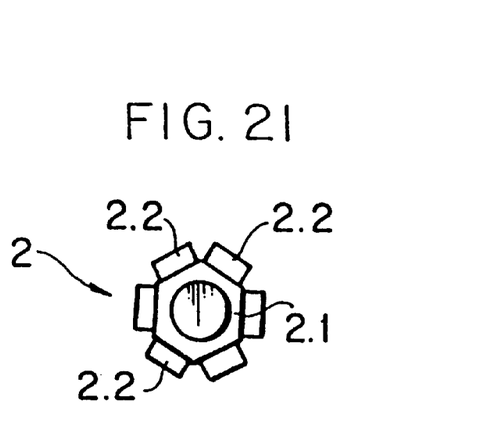
FIG. 21 is a side view thereof.

In the driving magnetic wheel 2 shown in FIGS. 20 and 21, a large number of permanent magnets 2.2 each having a pair of N and S poles are fixed at predetermined intervals to the plans peripheral surfaces of a cylindrical body 2.1 having a hexagonal section to constitute N- and S-pole zones 2n, 2s which describe a spiral discontinuously along the peripheral surface of the cylindrical body 2.1.

Figure 22:
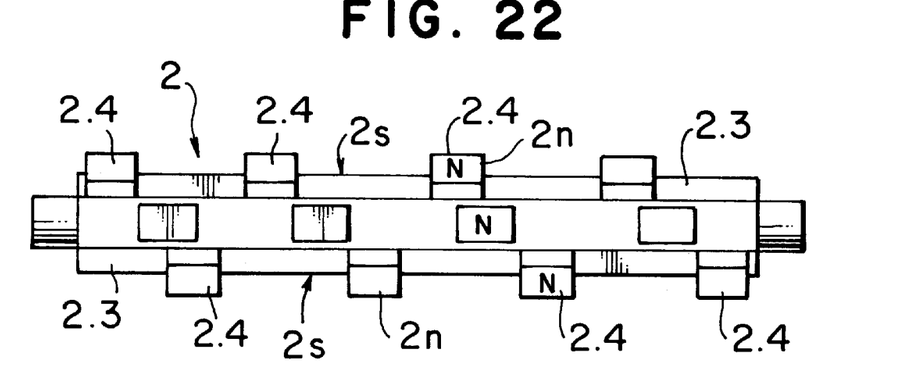
FIG. 22 is a front view of a driving magnetic wheel having permanent magnets of a single pole which are fixed to the peripheral surface of a cylindrical body.
Figure 23:
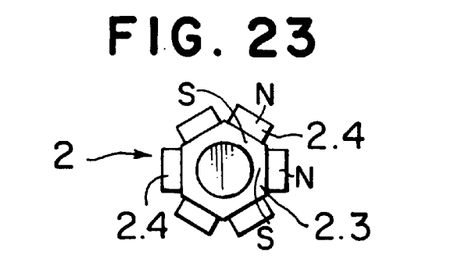
FIG. 23 is a side view thereof.

In the driving magnetic wheel 2 shown in FIGS. 22 and 23, a large number of permanent magnets 2.4 are fixed to the plane peripheral surfaces of a cylindrical body 2.3 having a hexagonal section in such a manner that only N (or S) poles appear on the outer surfaces. In this case, on the surfaces with the permanent magnets 2.4 not fixed thereto there appears the pole opposite to the pole on the outer surfaces, so that spiral N- and S-pole zones 2n, 2s are defined by both the outer surfaces of the permanent magnets 2.4 constituting a discontinuous spiral and the other peripheral surface portions of the cylindrical body 2.3

Figure 24:
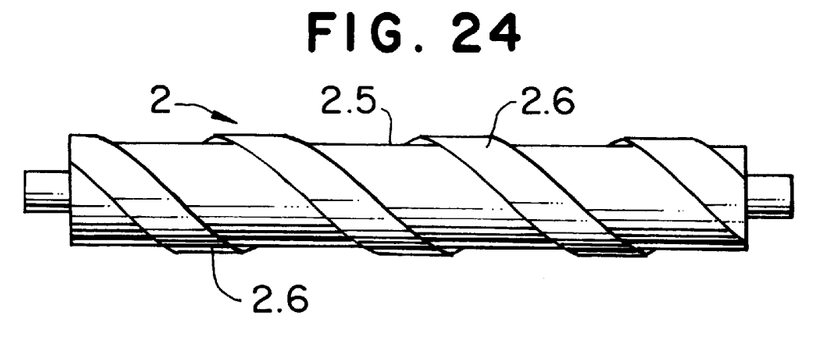
FIG. 24 is a front view of a driving magnetic wheel having a band-like rubber magnet wound round the outer periphery of a cylindrical body.
Figure 25:
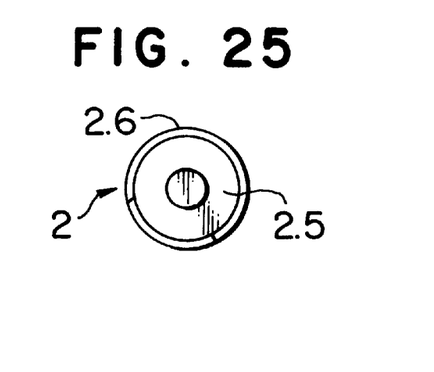
FIG. 25 is a side view thereof.

In the driving magnetic wheel 2 shown in FIGS. 24 and 25, a band-like permanent magnet 2.6, e.g. rubber or plastic magnet is wound and bonded spirally round the peripheral surface of a cylindrical body 2.5 which is in the shape of a circular cylinder. Since this permanent magnet is fixed so that only N (or S) pole appears on the outer surface, the cylindrical body 2.5 itself is magnetized to the opposite pole, and N- and S-pole sones 2n, 2s are constituted by both the permanent magnet 2.6 wound spirally around the peripheral surface of the cylindrical body 2.5 and the other exposed peripheral surface portion. It is optional whether the cylindrical bodies 2.1, 2.3 and 2.5 described above is to be formed of a magnetic material or a non-magnetic material.

The drive mechanisms a2, a2-1, a2-3 and a2-4 of the conveyors described above my be provided with an existing adjusting mechanism (not shown) in each bearing position which mechanism can slide the driving magnetic wheel 2 toward the axis 1a of each driven magnetic wheel 1 or slide the latter toward its axis 1a. In this case, by changing the spacing of the closely spaced portion between both magnetic wheels 1 and 2 through the said adjusting mechanism, it is made possible to make adjustment for increase or decrease of magnetic force, thereby adjusting the transfer torque.

In the drive mechanisms a2, a2-1, a2-3 and a2-4, the interference of magnetic forces between adjacent driven magnetic wheels 1 is prevented by adopting suitable shape, arrangement and construction of the driven magnetic wheels. However, as in the conveyor illustrated in FIG. 1, the interference preventing plate c may be interposed between adjacent driven magnetic wheels 1, whereby the effect of preventing such interference is rendered more perfect, and even in the case where the spacing between adjacent driven magnetic wheels 1 is fairly small, it becomes possible to prevent malfunction of the driven magnetic wheels.

Figure 26:
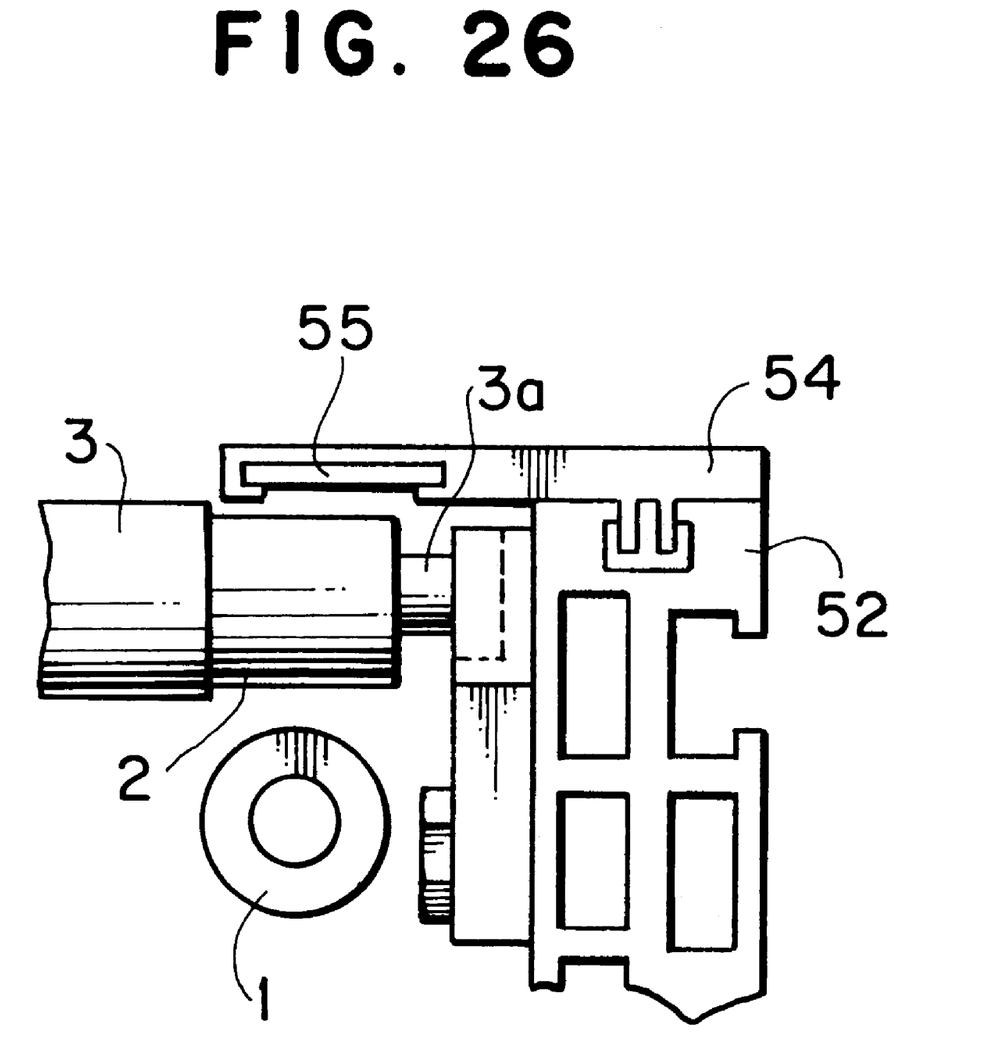
FIG. 26 is a vertical sectional view showing a drive mechanism portion of a conveyor having a magnetic place.

In each of the roller conveyors described above, a magnetic plate 55 may be disposed along a band plate 54 which is mounted along the upper side of the side plate 52. The magnetic plate 55 is disposed so as to cover both the driving magnetic wheel 1 and the driven magnetic wheels 2 arranged along the driving magnetic wheel. The magnetic plate 55 is for shutting off magnetic forces created upwards from both driving and driven magnetic wheels 2, 1 and thereby reducing the magnetic forces on the articles being carried on the conveyance path a1. Some articles to be conveyed dislike magnetic forces, such as floppy disk, by the influence on the articles being carried can be eliminated by diminishing the magnetic forces acting on the conveyance path al through the magnetic plate 55.

Having described specific preferred embodiments of the invention with reference to the accompanying drawings, it will be appreciated that the present invention is not limited to those precise embodiments, and that various changes and modification can be effected therein by one of ordinary skill in the art without departing from the scope or spirit of the invention as defined by the appended claims.

I claim:

1. A conveyor wherein a large number of rollers are arranged side by side to constitute a conveyance surface, said rollers being rotated by means of a drive mechanism, said drive mechanism comprising a driving magnetic wheel formed in the shape of a long shaft and a large number of driven magnetic wheels arranged at predetermined intervals in the axial direction of said driving magnetic wheel, each said driven magnetic wheel being positioned so that the axis thereof intersects the axis of said driving magnetic wheel perpendicularly or obliquely, each said driven magnetic wheel and said driving magnetic wheel being journalled so that the respective peripheral surfaces are kept close to each other, not in contact with each other, said driven magnetic wheels being connected each individually to end portions of said rollers, further, N- and S-pole zones of a permanent magnet are formed spirally on the peripheral surface of said driving magnetic wheel, while along the peripheral surface of each said driven magnetic wheel are formed N- and S-pole zones of a permanent magnet in an alternate manner, a circumferential pitch of the N- and S-pole zones in each said driven magnetic wheel being made coincident with a spiral pitch of the N- and S-pole zones in said driving magnetic wheel.

2. A conveyor wherein a large number of rollers are arranged side by side to constitute a conveyance surface, said rollers being rotated by means of a drive mechanism, said drive mechanism comprising a driving magnetic wheel formed generally in the shape of a shaft and a large number of driven magnetic wheels each formed generally in the shape of a cone or a regular polygonal cone, each said driven magnetic wheel being journalled in such a manner that the axis thereof intersects the axis of said driving magnetic wheel perpendicularly or obliquely and that the respective peripheral surfaces are kept close to each other, not in contact with each other, said driven magnetic wheels being connected each individually to end portions of said rollers, further, N- and S-pole zones of a permanent magnet are fared spirally on the peripheral surface of said driving magnetic wheel, while along the peripheral surface of each said driven magnetic wheel are formed N- and S-pole zones of a permanent magnet in an alternate wanner, a circumferential pitch of the N- and S-pole zones in each said driven magnetic wheel being made coincident with a spiral pitch of the N- and S-pole zones in said driving magnetic wheel.

3. A conveyor according to claim 2, wherein said driven magnetic wheels are arranged along the axis of said driving magnetic wheel in such a manner that adjacent said driven magnetic wheels are positioned alternately on one side of the axis of the driving magnetic wheel and on the other side thereof and that the conical surfaces of the adjacent driven magnetic wheels are opposed to each other in a sandwiching relation to the driving magnetic wheel.

4. A conveyor according to claim 2, wherein the N- and S- pole zones of each said driven magnetic wheel are formed by arranging and fixing a large number of permanent magnets in the circumferential direction of the conical surface of the generally conical shape or the generally regular polygonal shape.

5. A conveyor according to claim 3, wherein the N- and S- pole zones of each said driven magnetic wheel are formed by arranging and fixing a large number of permanent magnets in the circumferential direction of the conical surface of the generally conical shape or the generally regular polygonal shape.

6. A conveyor wherein a large number of rollers are arranged side by side to constitute a conveyance surface, said rollers being rotated by mans of a drive mechanism, said drive mechanism comprising a driving magnetic wheel formed generally in the shape of a shaft and a large number of driven magnetic wheels each formed generally in a disk shape or a regular polygonal plate shape, each said driven magnetic wheel being journalled so that the axis thereof intersects the axis of said driving magnetic wheel perpendicularly or obliquely and so that one end face thereof is kept close to, not in contact with, the peripheral surface of the driving magnetic wheel, said driven magnetic wheels being connected each individually to end portions of said rollers, further, N- and S-pole zones of a permanent magnet are formed spirally on the peripheral surface of said driving magnetic wheel, while in the circumferential direction of one end face of each said driven magnetic wheel are formed N- and S-pole zones of a permanent magnet, a circumferential pitch of the N- and S-pole zones at the one end face of the driven magnetic wheel being made coincident with a spiral pitch of the N- and S-pole zones in said driving magnetic wheel.

7. A conveyor according to claim 6, wherein said driven magnetic wheels are arranged along the axis of said driving magnetic wheel in such a manner that adjacent said driven magnetic wheels are positioned alternately on one side of the axis of the driving magnetic wheel and on the other side thereof and that the end faces of the adjacent driven magnetic wheels are opposed to each other in a sandwiching relation to the driving magnetic wheel.

8. A conveyor according to claim 6, wherein the N- and S-pole zones of each said driven magnetic wheel are formed by arranging a large number of permanent magnets in the circumferential direction of the end face of the generally disk shape or regular polygonal plate shape.

9. A conveyor according to claim 7, wherein the N- and S-pole zones of each said driven magnetic wheel are formed by arranging a large number of permanent magnets in the circumferential direction of the end face of the generally disk shape or regular polygonal plate shape.

10. A conveyor according to claim 1, wherein the N- and S-pole zones of the driving magnetic wheel are formed by arranging and fixing a large number of permanent magnets spirally along the peripheral surface of a circular or polygonal, cylindrical body.

11. A conveyor according to claim 2, wherein the N- and S-pole zones of the driving magnetic wheel are formed by arranging and fixing a large number of permanent magnets spirally along the peripheral surface of a circular or polygonal, cylindrical body.

12. A conveyor according to claim 6, wherein the N- and S-pole zones of the driving magnetic wheel are formed by arranging and fixing a large number of permanent magnets spirally along the peripheral surface of a circular or polygonal, cylindrical body.

13. A conveyor according to claim 1, wherein the N- and S-pole zones of the driving magnetic wheel are formed by winding a band-like rubber or plastic magnet spirally along the peripheral surface of a circular or polygonal, cylindrical body.

14. A conveyor according to claim 2, wherein the N- and S-pole zones of the driving magnetic wheel are formed by winding a band-like rubber or plastic magnet spirally along the peripheral surface of a circular or polygonal, cylindrical body.

15. A conveyor according to claim 6, wherein the N- and S-pole zone of the driving magnetic wheel are formed by winding a band-like rubber or plastic magnet spirally along the peripheral surface of a circular or polygonal, cylindrical body.

16. A conveyor according to claim 1, including an adjusting mechanism capable of adjusting the distance between the driving magnetic wheel and the driven magnetic wheels.

17. A conveyor according to claim 2, including an adjusting mechanism capable of adjusting the distance between the driving magnetic wheel and the driven magnetic wheels.

18. A conveyor according to claim 6, including an adjusting mechanism capable of adjusting the distance between the driving magnetic wheel and the driven magnetic wheels.

* * * * *